US009098903B2

(12) United States Patent
Galoppo et al.

(10) Patent No.: US 9,098,903 B2
(45) Date of Patent: Aug. 4, 2015

(54) SYSTEMS AND METHODS FOR DETECTING ALIGNMENT ERRORS (75) Inventors: Travis J. Galoppo, Grand Island, NY (US); Brett Rimes, Grand Island, NY (US); John R. Soltysiak, Blasdell, NY (US); Anthony V. Moscato, North Tonawanda, NY (US); Theodore F. Cyman, Jr., Grand Island, NY (US)

(73) Assignee: R.R. Donnelley & Sons Company, Chicago, IL (US)

( * ) Notice: Subject to any disclaimer, the term of this patent is extended or adjusted under 35 U.S.C. 154(b) by 529 days.

(21) Appl. No.: 12/840,860

(22) Filed: Jul. 21, 2010

(65) Prior Publication Data

US 2011/0019876 A1    Jan. 27, 2011

Related U.S. Application Data (60) Provisional application No. 61/271,412, filed on Jul. 21, 2009.

(51) Int. Cl.
G06T 7/00    (2006.01)
H04N 1/50    (2006.01)

(52) U.S. Cl.
CPC ............ *G06T 7/0024* (2013.01); *H04N 1/506* (2013.01)

(58) Field of Classification Search
CPC   B41J 2/04505; B41J 2202/21; G06K 15/102; G06K 15/02; G06K 7/1473
USPC .................................................. 382/112, 319
See application file for complete search history.

(56) References Cited

U.S. PATENT DOCUMENTS 3,599,229 A    8/1971    Merrell
3,717,722 A    2/1973    Messner
(Continued)

FOREIGN PATENT DOCUMENTS

EP    0835761 B1    4/1998
EP    1522411 A2    4/2005
(Continued)

OTHER PUBLICATIONS

Reply to Written Opinion accompanying the European Supplementary Search Report for European Patent Application No. EP1979117, dated Jul. 27, 2009, 4 pages.
(Continued)

*Primary Examiner* — Amir Alavi
*Assistant Examiner* — Kenny Cese
(74) *Attorney, Agent, or Firm* — McCracken & Gillen LLC (57) ABSTRACT A method of detecting an alignment error includes the steps of controlling a first portion of one or more imaging units to image on a substrate a first plurality of substantially parallel lines extending along a first direction and a second plurality of substantially parallel lines extending along a second direction and controlling a second portion of one or more imaging units to image a third plurality of substantially parallel lines extending along the first direction and a fourth plurality of substantially parallel lines extending along the second direction. One or more distances between adjacent lines of the second plurality of lines are varied and one or more distances between adjacent lines of the fourth plurality of lines are varied. Further, the lines imaged by the first and second portions form an alignment pattern. The method further includes the steps of collecting data relating to the alignment pattern and analyzing the collected data to determine an alignment error between the first and second portions of the one or more imaging units.

20 Claims, 8 Drawing Sheets

(56) References Cited

U.S. PATENT DOCUMENTS

| | | | |
|---|---|---|---|
| 3,803,628 A | 4/1974 | Van Brimer et al. |
| 3,911,818 A | 10/1975 | MacIlvaine |
| 3,925,790 A | 12/1975 | Fishbeck |
| 4,146,900 A | 3/1979 | Arnold |
| 4,219,822 A | 8/1980 | Paranjpe |
| 4,238,804 A | 12/1980 | Warren |
| 4,320,406 A | 3/1982 | Heinzl |
| 4,401,024 A | 8/1983 | Frentress |
| 4,463,359 A | 7/1984 | Ayata et al. |
| 4,477,103 A | 10/1984 | Bertolazzi |
| 4,728,968 A | 3/1988 | Hillmann et al. |
| 4,792,860 A | 12/1988 | Kuehrle |
| 4,804,979 A | 2/1989 | Kamas et al. |
| 4,835,713 A | 5/1989 | Pastor |
| 4,839,674 A | 6/1989 | Hanagata et al. |
| 4,847,660 A | 7/1989 | Wheatley, Jr. et al. |
| 4,878,063 A | 10/1989 | Katerberg |
| 4,994,975 A | 2/1991 | Minschart |
| 5,031,530 A | 7/1991 | Burger |
| 5,069,124 A | 12/1991 | Schneider |
| 5,079,571 A | 1/1992 | Eriksen |
| 5,102,110 A | 4/1992 | Reynolds |
| 5,129,568 A | 7/1992 | Fokos et al. |
| 5,160,946 A | 11/1992 | Hwang |
| 5,224,640 A | 7/1993 | Fokos et al. |
| 5,266,976 A | 11/1993 | Ohigashi et al. |
| 5,287,162 A | 2/1994 | de Jong et al. |
| 5,289,208 A | 2/1994 | Haselby |
| 5,298,761 A | 3/1994 | Aoki et al. |
| 5,313,886 A | 5/1994 | Muller |
| 5,365,847 A | 11/1994 | Pers |
| 5,384,592 A | 1/1995 | Wong |
| 5,408,746 A | 4/1995 | Thoman et al. |
| 5,434,956 A | 7/1995 | Son et al. |
| 5,617,128 A | 4/1997 | Thoman et al. |
| 5,648,801 A | 7/1997 | Beardsley et al. |
| 5,688,059 A | 11/1997 | Clarke et al. |
| 5,689,289 A | 11/1997 | Watanabe et al. |
| 5,704,282 A | 1/1998 | Khalid |
| 5,715,498 A | 2/1998 | Takeuchi et al. |
| 5,765,083 A | 6/1998 | Shinohara |
| 5,765,481 A | 6/1998 | Tortora et al. |
| 5,784,077 A | 7/1998 | Silverbrook |
| 5,793,397 A | 8/1998 | Barker et al. |
| 5,796,411 A | 8/1998 | Cyman et al. |
| 5,796,414 A | 8/1998 | Sievert et al. |
| 5,797,305 A | 8/1998 | Harrod et al. |
| 5,806,430 A | 9/1998 | Rodi |
| 5,868,069 A | 2/1999 | Khalid et al. |
| 5,889,534 A | 3/1999 | Johnson et al. |
| 5,995,717 A | 11/1999 | Tanaka |
| 6,003,988 A | 12/1999 | McCann et al. |
| 6,065,400 A | 5/2000 | Van Weverberg |
| 6,068,362 A | 5/2000 | Dunand et al. |
| 6,072,587 A | 6/2000 | Hicks |
| 6,109,722 A | 8/2000 | Underwood et al. |
| 6,146,035 A | 11/2000 | Ishigouoka et al. |
| 6,213,580 B1 | 4/2001 | Segerstrom et al. |
| 6,224,192 B1 | 5/2001 | Robinson et al. |
| 6,236,463 B1 | 5/2001 | Cyman et al. |
| 6,317,147 B1 | 11/2001 | Tanaka |
| 6,325,480 B1 | 12/2001 | Moghadam et al. |
| 6,375,296 B1 | 4/2002 | McGarry et al. |
| 6,390,588 B1 | 5/2002 | Ikeda |
| 6,409,301 B1 | 6/2002 | Takata et al. |
| 6,411,324 B1 | 6/2002 | Christiansen et al. |
| 6,422,678 B1 | 7/2002 | Serra et al. |
| 6,450,607 B1 * | 9/2002 | Bolash et al. ................... 347/19 |
| 6,450,614 B1 | 9/2002 | Scheffelin et al. |
| 6,460,441 B1 | 10/2002 | Harrod |
| 6,467,874 B1 | 10/2002 | Williams et al. |
| 6,499,822 B1 | 12/2002 | Abe et al. |
| 6,547,370 B2 | 4/2003 | Mantell et al. |
| 6,563,524 B1 * | 5/2003 | Regimbal et al. ............. 347/116 |
| 6,599,040 B2 | 7/2003 | Nakazawa et al. |
| 6,622,621 B2 | 9/2003 | Bucher et al. |
| 6,644,773 B2 | 11/2003 | Bildstein et al. |
| 6,663,206 B2 | 12/2003 | Taylor |
| 6,682,163 B2 | 1/2004 | Metzler et al. |
| 6,688,721 B1 | 2/2004 | Serra |
| 6,712,444 B2 | 3/2004 | Abe et al. |
| 6,763,220 B2 | 7/2004 | Nakazawa |
| 6,789,870 B2 | 9/2004 | Barnes et al. |
| 6,891,630 B1 | 5/2005 | Miyasaka et al. |
| 6,909,516 B1 | 6/2005 | Hoover |
| 7,013,803 B2 | 3/2006 | Hansen et al. |
| 7,014,289 B1 | 3/2006 | Matsuda |
| 7,021,732 B2 | 4/2006 | Folkins |
| 7,021,738 B2 | 4/2006 | Juan et al. |
| 7,168,784 B2 | 1/2007 | Donovan et al. |
| 7,209,600 B2 | 4/2007 | Goldberg |
| 7,216,952 B2 | 5/2007 | Claramunt et al. |
| 7,242,494 B2 | 7/2007 | Hanazato |
| 7,309,118 B2 | 12/2007 | Mizes et al. |
| 7,543,911 B2 | 6/2009 | Mizes et al. |
| 7,552,986 B2 | 6/2009 | Mizes et al. |
| 2003/0210412 A1 * | 11/2003 | Ishibashi ........................ 358/1.9 |
| 2005/0073539 A1 | 4/2005 | McGarry et al. |
| 2006/0039015 A1 | 2/2006 | Kageyama et al. |
| 2006/0139392 A1 | 6/2006 | Fernandez et al. |
| 2007/0053024 A1 * | 3/2007 | Kitao ............................ 358/518 |
| 2008/0036803 A1 * | 2/2008 | Yun .................................. 347/9 |
| 2008/0062219 A1 * | 3/2008 | Mizes et al. ..................... 347/19 |
| 2008/0309951 A1 * | 12/2008 | Kishi et al. ..................... 358/1.2 |

FOREIGN PATENT DOCUMENTS

| | | |
|---|---|---|
| EP | 1522411 A3 | 1/2007 |
| JP | 2004112045 | 4/2004 |
| WO | 2007092490 A3 | 8/2007 |

OTHER PUBLICATIONS

International Search and Written Opinion for International Patent Application No. PCT/US2007/003240, dated Sep. 27, 2007, 9 pages.
International Preliminary Report on Patentability for International Patent Application No. PCT/US2007/003240, dated Aug. 14, 2008, 6 pages.
Extended European search report for International Patent Application No. PCT/US2007/003240, dated Jan. 15, 2009, 9 pages.
International Search Report and Written Opinion for International Application No. PCT/US2008/008115, dated Jan. 20, 2009, 18 pages.
International Preliminary Report on Patentability for International Application No. PCT/US2008/008115, dated Jan. 14, 2010, 10 pages.

* cited by examiner

SYSTEMS AND METHODS FOR DETECTING ALIGNMENT ERRORS

CROSS REFERENCE TO RELATED APPLICATIONS

This application claims the benefit of U.S. Provisional Application Ser. No. 61/271,412, filed Jul. 21, 2009, and incorporated herein by reference in its entirety.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present disclosure relates to systems and methods for detecting alignment errors, such as, registration and/or stitching errors, of one or more imaging units and/or printheads.

2. Background of the Invention

High-speed printing systems typically include one or more imaging units. Each imaging unit has one or more printheads and a controller controls each printhead to eject ink onto a substrate, e.g., a paper web, to produce an image. In one example, the printing system includes one or more printhead arrays or assemblies, which can be stationary during the production of a print job while the substrate moves at high speed past the arrays. Each printhead of the array(s) generally prints a specific portion or printing swath of an image along a width of the substrate. The printing swaths of the printheads are stitched together so that adjacent printing swaths are properly aligned with each other. Further, many high-speed printing systems include multiple imaging units, each with one or more printhead arrays that are controlled to overprint images onto the substrate in different colors. The overprinted images are overlapped or registered with each other to produce the desired image. Errors in the stitching and/or registration occasionally arise, wherein such errors first have to be detected before they can be corrected, such as, by moving the printheads relative to each other and/or controlling the ejection of ink from the printheads.

SUMMARY OF THE INVENTION

In one example, a method of detecting an alignment error includes the steps of controlling a first portion of one or more imaging units to image on a substrate a first plurality of substantially parallel lines extending along a first direction and a second plurality of substantially parallel lines extending along a second direction and controlling a second portion of one or more imaging units to image a third plurality of substantially parallel lines extending along the first direction and a fourth plurality of substantially parallel lines extending along the second direction. One or more distances between adjacent lines of the second plurality of lines are varied and one or more distances between adjacent lines of the fourth plurality of lines are varied. Further, the lines imaged by the first and second portions form an alignment pattern. The method further includes the steps of collecting data relating to the alignment pattern and analyzing the collected data to determine an alignment error between the first and second portions of the one or more imaging units.

In another example, a system for detecting an alignment error includes one or more imaging units, a sensor, and a controller to control a first portion of the one or more imaging units to image on a substrate a first plurality of substantially parallel lines extending along a first direction and a second plurality of substantially parallel lines extending along a second direction, and to control a second portion of the one or more imaging units to image a third plurality of substantially parallel lines extending along the first direction and a fourth plurality of substantially parallel lines extending along the second direction. In addition, one or more distances between adjacent lines of the second plurality of lines are varied, one or more distances between adjacent lines of the fourth plurality of lines are varied, and the lines imaged by the first and second portions form an alignment pattern. The controller is configured to control the sensor to collect data relating to the alignment pattern and the controller is further configured to analyze the collected data to determine an alignment error between the first and second portions of the one or more imaging units.

DETAILED DESCRIPTION

An alignment system, as disclosed herein, can be utilized to simplify and automate the process of detecting alignment errors in one or more printheads and to provide instructions to correct such alignment errors. In one example, the alignment system instructs one or more printheads to produce an alignment pattern on a substrate and the alignment system includes a moveable sensor that captures images of portions of the alignment pattern. The images can be captured while the substrate is moving or stationary. The images are analyzed to measure characteristics of the printed alignment pattern. More particularly, such measured characteristics are compared to expected values to determine alignment errors. In other examples, the analysis of the images includes various processes to increase the accuracy of the measurements. Such processes include, for example, determining an actual magnification of the images to obtain accurate measurements in the captured images, taking averages of multiple measurements, and calibrating the alignment system for camera and/or lighting variations.

Figures 1, 2:
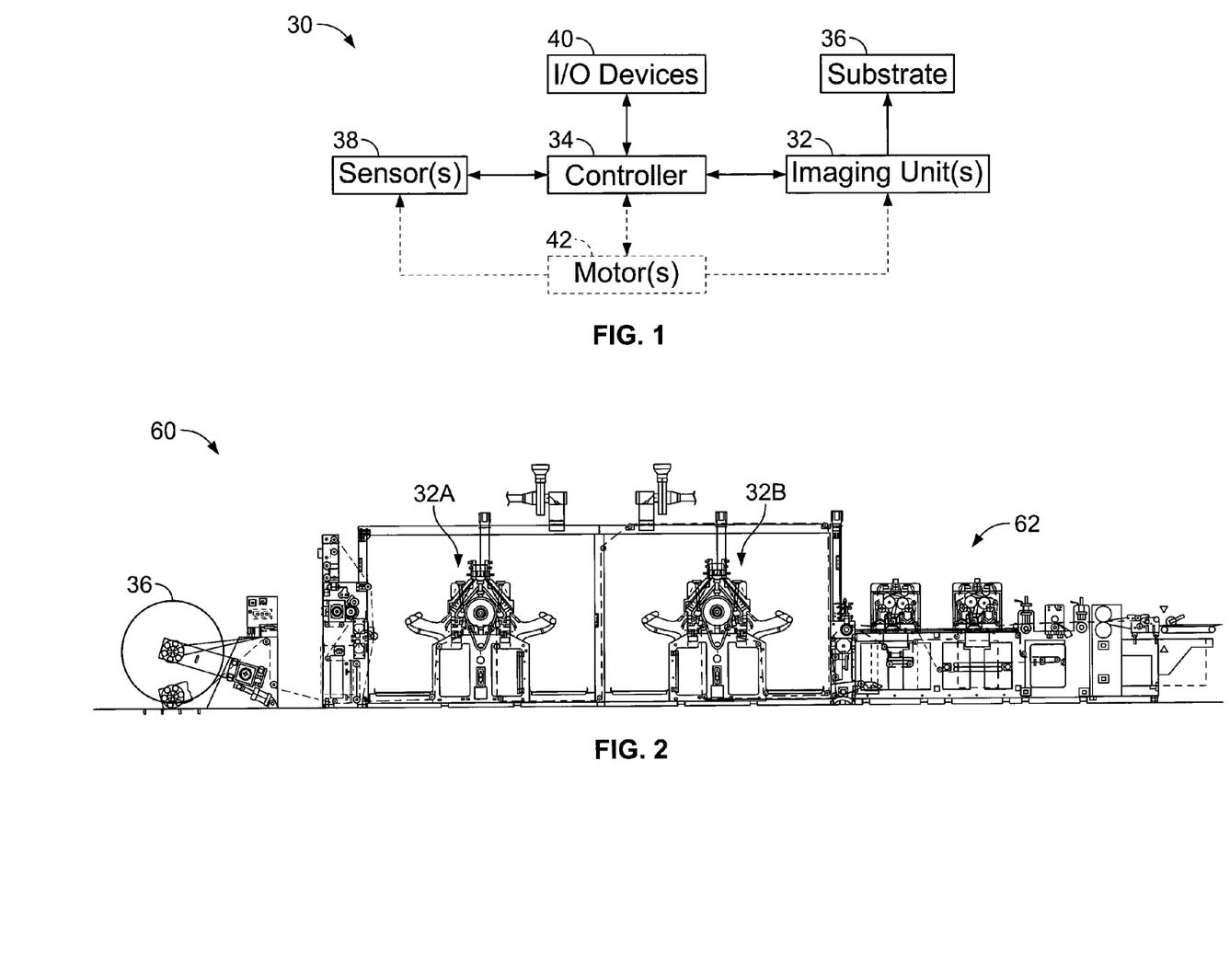
FIG. 1 illustrates a block diagram of an alignment system for detecting and correcting alignment errors of one or more printheads.
FIG. 2 is a side elevational view of a printing system according to one embodiment.

FIG. 1 illustrates an alignment system 30 for detecting and correcting alignment errors, such as registration and/or stitching errors, in one or more imaging units 32 that each include one or more printheads. The alignment system 30 includes a controller 34 with suitable hardware and/or software to control various components coupled thereto. For example, such hardware/software may include, e.g., proprietary and/or publicly available software for controlling the imaging unit(s) 32 to produce images on a substrate 36, such as a paper web, PC based controllers, PLC based controllers, raster image processors, memory units, and the like. The controller 34 further controls the imaging unit(s) 32 to produce an alignment pattern on the substrate 36, as will be described in more detail hereinafter. The alignment system 30 also includes one or more sensors 38 that are operated by the controller 34 to collect data regarding the alignment pattern and such data is analyzed by the controller to detect alignments errors. Additionally, the alignment system 30 typically includes one or more input/output ("I/O") devices 40 to facilitate interaction with the system by a user. The I/O devices 40 may include one or more of a monitor, a keypad, keyboard, and/or pushbuttons, a mouse, a touch screen, media drives, and the like. The alignment system 30 also optionally includes one or more motors 42 (indicated by dashed lines). The motor(s) may be associated with the sensor(s) 38 and/or the imaging unit(s) 32 to move one or more sensors to collect data from different portions of the alignment pattern and/or to move portions of an imaging unit, for example.

In other embodiments, the alignment system 30 of FIG. 1 can be modified to include fewer or additional components in any suitable arrangement. For example, the alignment system 30 can include multiple controllers 34 that control different functions of the system, such as, controlling the imaging unit(s) 32 to produce images on the substrate 36, controlling the sensor(s) 38 to collect data, detecting and correcting alignment errors, and other functions described herein and/or that would be apparent to one of skill in the art. In another example, the alignment system 30 includes wired or wireless network connections. Other modifications can be made to the alignment system 30 without departing from the spirit of the present disclosure.

FIG. 2 shows an example of a general printing system 60 configured with first and second imaging units 32A, 32B respectively, and finishing systems 62 downstream of the imaging units. A substrate 36, such as, a paper web is fed through the imaging units 32 and finishing systems 62. In the present example, the first imaging unit 32A prints on a first or front side of the substrate 36 and the second imaging unit 32B prints on a second or back side of the substrate. However, in other embodiments, the first and second imaging units 32A, 32B and any other number of additional imaging units can be arranged to print on the same or different sides of the substrate in one or more colors. Further details of the printing system 60 can be found in Moscato et al. U.S. Patent Publication Number 2007/0222805 filed on Feb. 2, 2007, the disclosure of which is incorporated by reference herein in its entirety.

Figure 3A:
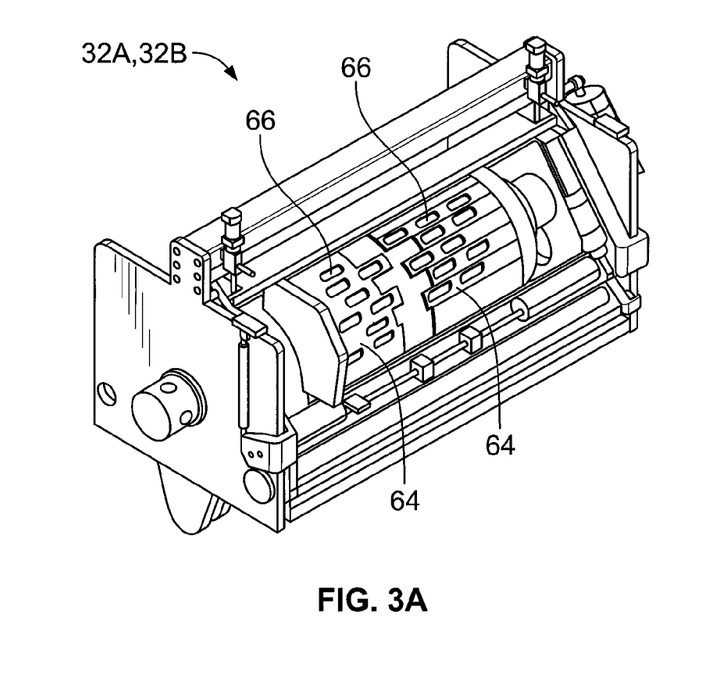
FIG. 3A is a diagrammatic view of an imaging unit used in the printing system of FIG. 2.
Figure 3B:
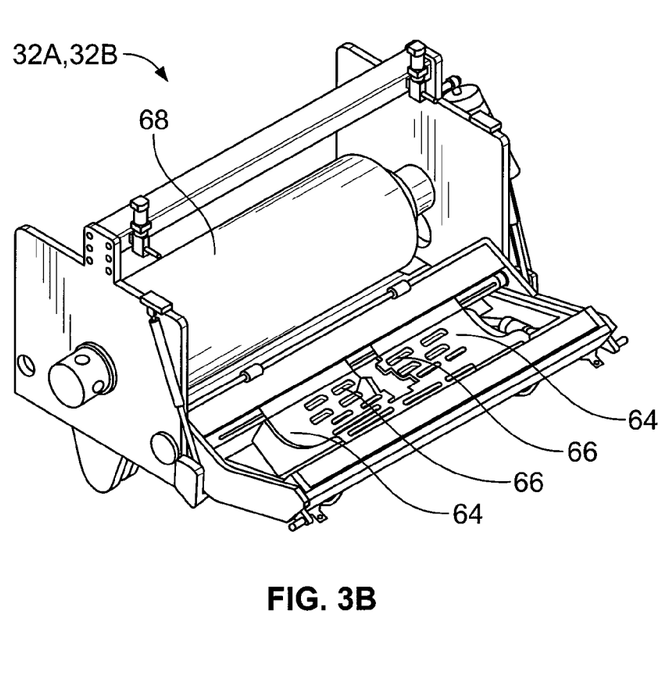
FIG. 3B is another diagrammatic view of the imaging unit of FIG. 3A.

Referring to FIGS. 3A and 3B, each imaging unit 32A, 32B may include two printhead assemblies 64 on a first side of the imaging unit and two printhead assemblies on a second side of the imaging unit (only one side of the imaging unit is illustrated in FIGS. 3A and 3B), wherein each printhead assembly includes one or more slots 66 for receiving inkjet printheads or cartridges. Examples of suitable printheads are those used in desktop printers, plotters, and industrial printers. The printhead assemblies 64 are positioned around a drum 68 that rotates and drives a paper web past the printhead assemblies. The individual printheads are controlled to print specific portions or printing swaths of an image on the paper web. In other contemplated embodiments, more than one printhead within a single printhead assembly 64, between printhead assemblies of a single imaging unit 32, and/or between multiple imaging units are controlled to print the same portion or printing swath of an image and such printheads are controlled to produce images that are overlaid or registered on previously printed images. In one example, each printhead assembly 64 prints one color such that a first color of an image is printed, a second color of the image is overprinted on the first color by a downstream printhead assembly, and so on. Each printhead assembly 64 can print more than one color and individual printheads in each printhead assembly can likewise print one or more colors. Other modifications to the printing system 60 of FIGS. 2, 3A, and 3B can be made as would be apparent to one of ordinary skill in the art.

In printing systems, such as, the printing system 60 of FIGS. 2, 3A, and 3B, the alignment system 30 of FIG. 1 can be utilized therewith to control the imaging unit(s) 32 to print an alignment pattern on the substrate 36 that is analyzed to detect alignment errors. The alignment system 60 of FIG. 1 is further utilized to correct for such detected errors, e.g., by providing instructions to adjust the positions of printheads within the imaging unit(s) 32 and/or by modifying the data sent to the imaging units to produce images.

Figure 4:
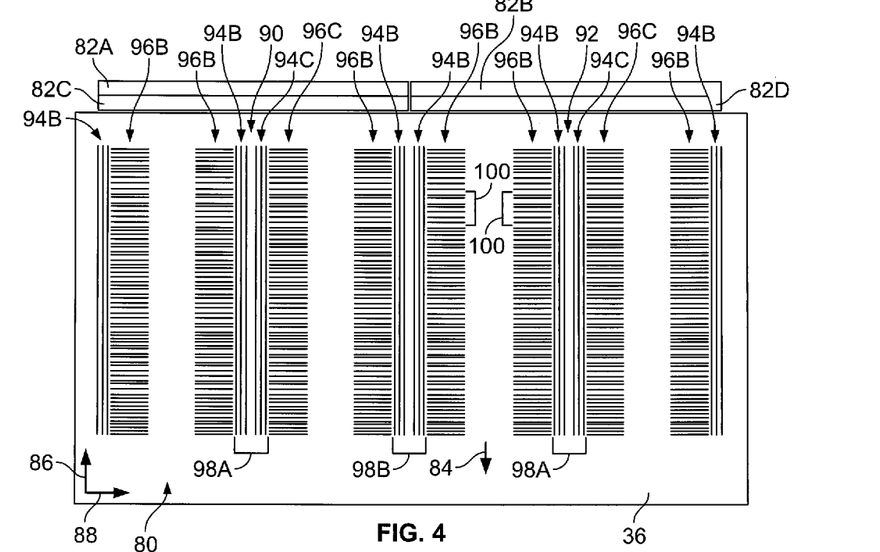
FIG. 4 is one embodiment of an alignment pattern that can be used by the system of FIG. 1 to detect and correct alignment errors of one or more printheads.

FIG. 4 illustrates a portion of an alignment pattern 80 printed on a substrate 36 by first, second, third, and fourth printheads 82A, 82B, 82C, 82D, respectively, according to one embodiment. An arrow 84 in FIG. 4 represents a direction in which the substrate 36 moves past the printheads 82 during a printing process. For reference purposes only, a Y-axis 86 and an X-axis 88 are defined with respect to the arrow 84, wherein the Y-axis is generally parallel to the arrow and the X-axis is generally orthogonal to the arrow. Further, dimensions along the Y-axis 86 may be referred to as being along a length of the substrate and dimensions along the X-axis 88 may be referred to as being across a width of the substrate.

Referring to FIG. 4 in the context of FIGS. 2, 3A, and 3B, the first and second printheads 82A, 82B are adjacent printheads disposed on the first side of the imaging unit 32 and the third and fourth printheads 82C, 82D are corresponding adjacent printheads on the second side of the imaging unit. In one example, the first and second printheads 82A, 82B print in black ink and the second and third printheads 82C, 82D print in cyan ink. However, in other examples, the printheads 82A-82D print in one or more different colors, e.g., yellow, magenta, etc. In the present example, the first and third printheads 82A, 82C print a first portion 90 of the alignment pattern 80 and the second and fourth printheads 82B, 82D print a second portion 92 of the alignment pattern. In the present embodiment, each of the first and second portions 90, 92 are identical patterns, although, in other embodiments the first and second portions need not be identical if the expected relations between the first and second portions are known. Each of the first and second portions 90, 92 of the alignment pattern 80 includes separate groups of spaced apart vertical lines 94 generally parallel to the Y-axis 86 and separate groups of spaced apart horizontal lines 96 generally parallel to the X-axis 88. In FIG. 4, each group of spaced apart vertical lines 94 includes three lines that are separated by known expected distances from each other. The alignment pattern 80 further includes one or more portions 98 where a first group of three vertical lines 94 is adjacent a second group of three vertical lines 94 and the adjacent groups of vertical lines within each portion 98 are separated by a known expected distance. FIG. 4 includes portions 98A that are disposed within a single printing swath printed by the first and third printheads 82A, 82C or the second and fourth printheads 82B, 82D and portions 98B that are disposed between adjacent printheads 82A, 82B or 82C, 82D. The portions 98 are analyzed, as will be described in more detail hereinafter, to detect alignment errors along the X-axis 88. Further, each group of spaced apart horizontal lines 96 includes a plurality of lines that are each separated by one or more different known expected distances to form an identifiable pattern 100. In one example, the pattern 100 includes six or more lines separated by a plurality of different known expected distances and the pattern can be repeated within the groups of horizontal lines 96. Each group of spaced apart horizontal lines 96 is further spaced from an adjacent group of spaced apart horizontal lines by an unprinted space or by groups of spaced apart vertical lines 94. Adjacent groups of horizontal lines 96 are analyzed, as will be described in more detail hereinafter, to identify and match the pattern 100 between such adjacent groups to detect alignment errors along the Y-axis 86.

In the present embodiment, each of the first and second printheads prints groups of vertical and horizontal lines 94B, 96B, respectively, in black ink and each of the third and fourth printheads 82C, 82D prints a group of vertical lines and a group of horizontal lines 94C, 96C, respectively, in cyan ink. In this embodiment, the alignment pattern 80 can be used to register and align portions that are printed in the same and/or different colors by printheads 82 on the same and/or different sides of the imaging unit(s) 32. In other embodiments, the groups of vertical and horizontal lines 94, 96 can be printed in one or more other colors, e.g., each line of the groups 94C, 96C can be printed with both cyan and magenta to potentially increase the contrast of such lines and/or to register different printheads of the imaging unit(s) 32 to one another.

FIG. 4 merely illustrates an example of portions of an alignment pattern 80 that are printed by printheads 82A-82D. In other examples, additional printheads 82 within one or more imaging units 32 are instructed to print additional portions of the alignment pattern 80, wherein such additional portions can be the same or different than the portions illustrated in FIG. 4, as would be apparent to one of skill in the art.

In use, the alignment system 80 controls a sensor 38, such as a camera, to capture images of portions of the alignment pattern 80 when the substrate 36 is moving and/or stationary. In one embodiment, the sensor 38 is a USB camera that has a sensor size of about 640×480 DPI and is capable of obtaining a focused image with a resolution of about 2000 DPI at about 20× magnification. Examples of such cameras can be obtained through Celestron, LLC., of 2835 Columbia St., Torrance, Calif. 90503. However, in other embodiments, other types of sensors 38 can be used, as would be apparent to one of ordinary skill in the art.

Figure 5A:
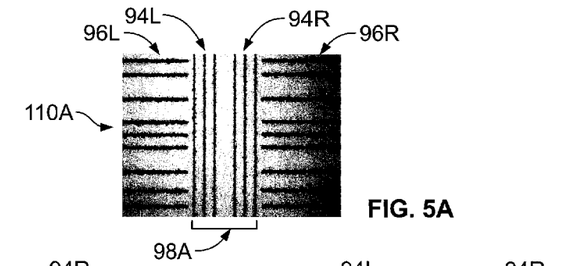
FIG. 5A illustrates an image captured by a sensor of the system of FIG. 1.
Figure 5B:
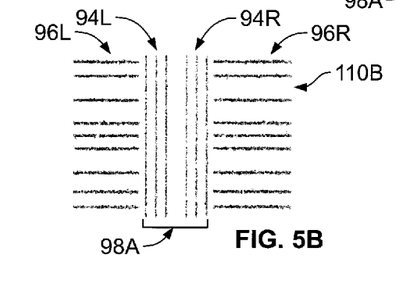
FIG. 5B illustrates the image of FIG. 5A after whiteness correction.
Figure 5C:
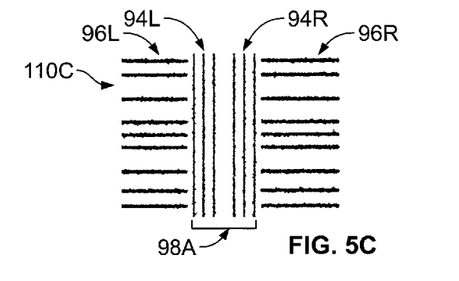
FIG. 5C illustrates the image of FIG. 5B after binarization.

FIGS. 5A-5B illustrate an image 110 of the alignment pattern 80 captured by the sensor 38 and converted to an 8-bit grayscale image 110A (FIG. 5A), processed to obtain an image 110B that is whiteness corrected (FIG. 5B), and further processed to obtain a binarized image 110C (FIG. 5C). In the present example, the processing to convert the image 110 to grayscale, to correct for whiteness, and to binarize the image is performed to develop a representation of the image 110 that can be processed by the alignment system 30 to accurately determine positions of the various lines of the alignment pattern 80.

Referring generally to FIGS. 5A-5C, the image 110 captured by the sensor 38 includes first and second adjacent groups of three vertical lines 94L, 94R, respectively, and portions of first and second adjacent groups of horizontal lines, 96L, 96R, that are separated by the vertical lines. The image 110 can represent a portion of the alignment pattern 80 within a single printing swath or between adjacent printing swaths in order to detect alignment errors between printheads in one or more imaging units 32. In order to facilitate the following discussion, the image 110 will be considered as representing portions of the alignment pattern 80 printed by adjacent printheads 82A, 82B. More particularly, the first printhead 82A prints the first group of horizontal lines 96L and the first group of three vertical lines 94L and the second printhead 82B prints the second group of horizontal lines 96R and the second group of three vertical lines 94R.

Figures 6, 7, 8:
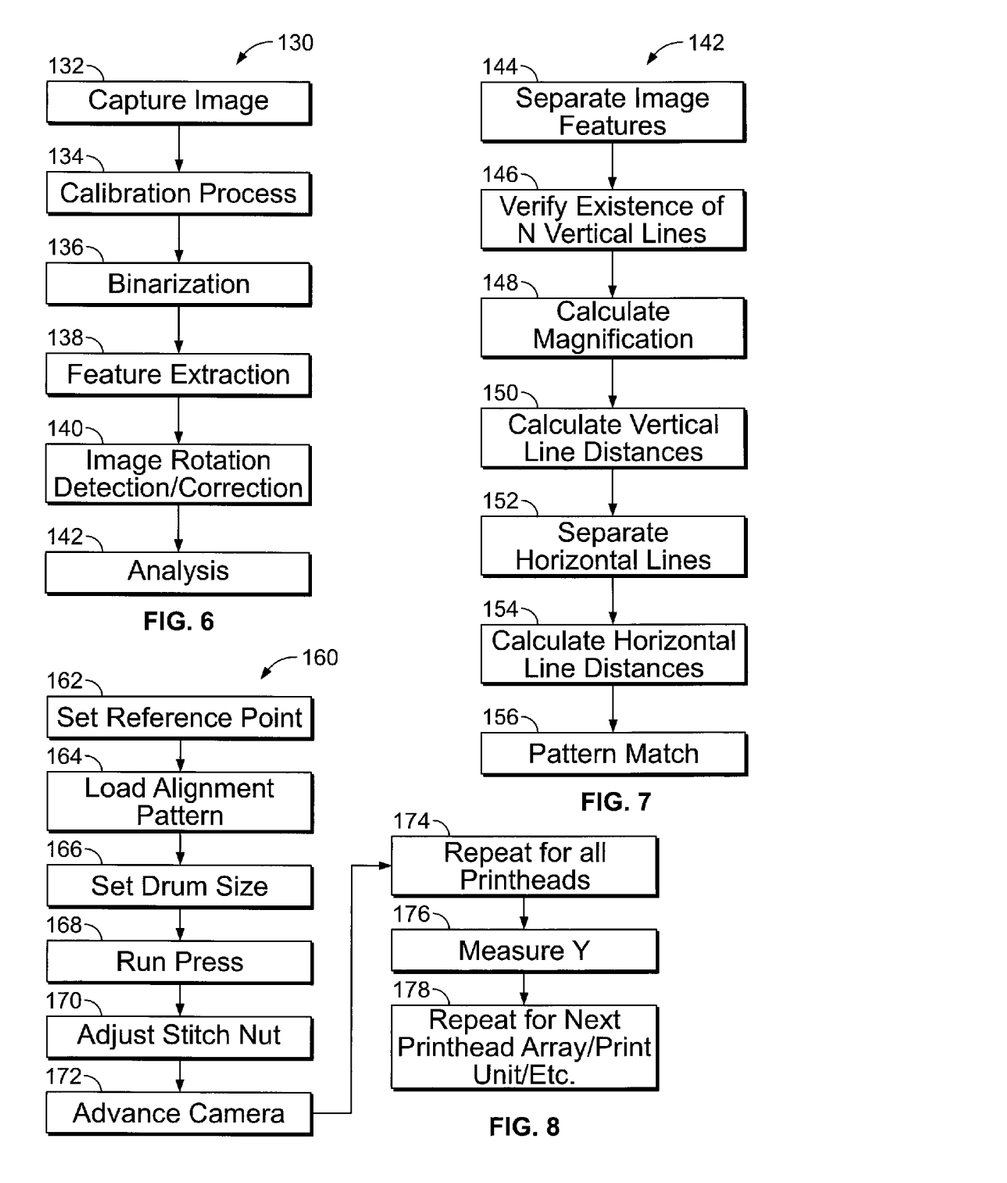
FIG. 6 is a flowchart according to one embodiment of a process for detecting alignment errors.
FIG. 7 is a flowchart according to one embodiment of an analysis process of FIG. 6.
FIG. 8 is a flowchart according to one embodiment of a process for detecting alignment errors.

FIG. 6 illustrates a process 130 that can be implemented by suitable hardware and/or software incorporated into the controller 34, for example, to detect alignment errors. At a first block 132, images of the alignment pattern 80 are captured by the sensor 38 while the substrate 36 is stationary. Images can also be captured while the substrate 36 is in motion, however, then the horizontal lines tend to blur together and measurements are generally only reliable for the vertical lines. In one embodiment, the image captured by the sensor 38 is provided in 32-bit RGB color and the block 134 converts the 32-bit color image to the 8-bit grayscale image 110A of FIG. 5A according to the formula:

$$GRAY=255-(0.23*RED+0.75*GREEN+0.02*BLUE).$$

The conversion according to the above formula results in values in the range [0,255], wherein 0 is white and 255 is black. In situations where the alignment pattern 80 is printed with black and cyan, the above formula results in a color mixture so that cyan is converted to very dark gray (nearly black), in order to simplify a subsequent binarization step. However, in other situations, e.g., with respect to printheads 82 that print other colors, the above formula may be modified accordingly to obtain a grayscale image that simplifies the binarization step, as would be apparent to one of ordinary skill in the art.

In the present embodiment, after the block 132, control passes to a block 134 to perform a calibration process that adjusts for camera and/or lighting inconsistencies. For example, some cameras capture images that include a vignette or fading around an outer portion of the image. The calibration process of the block 134 involves subtracting a pre-captured "blank" image, e.g., an image of an unprinted substrate, from the captured current image 110 to obtain the image 110B of FIG. 5B that is whiteness corrected.

Following the block 134, a block 136 performs a binarization process to convert the grayscale image 110A of FIG. 5A to the 1-bit per pixel black and white binarized image 110C of FIG. 5C. In some embodiments, the grayscale image 110A is binarized simply by turning all pixels with a value greater than 127 to black and all pixels with a value less than or equal to 127 to white. However, in some situations, the whiteness correction performed by the block 134 affects a nominal threshold value (e.g., the median value of 127 within the range of [0,255]) that is used during the binarization process. In such situations, a reasonable threshold value is determined by collecting several sample images, performing whiteness correction on the sample images, and applying an expectation maximization (EM) algorithm to the whiteness corrected images. EM is a standard machine learning algorithm for discovering clusters or distributions within data and its use and application would be apparent to one of ordinary skill in the art. In this context, EM can be used to determine the distribution of light and dark pixel values. The resulting threshold, T, is used to determine each pixel's color, such that each pixel greater T is interpreted as black and each pixel less than or equal to T is interpreted as white to obtain the binarized image 110C of FIG. 5C.

Following the block 136, control passes to a block 138, which extracts features within the image 110C of FIG. 5C. Feature extraction involves assigning group labels to connected groups of black pixels. Each group becomes a "feature" of the image. In the present embodiment, each "feature" is a line in the alignment pattern 80. The block 138 performs the feature extraction process in two passes. During a first pass, each pixel is labeled by assigning a group number to the pixel. Proceeding left to right, top to bottom over the image 110C, for each pixel, if the pixel is black then the block 138 examines the labels of neighboring pixels. If none of the neighboring pixels are labeled, such as, if they are all white pixels, then the current pixel is assigned a new label, wherein labels are assigned sequentially starting at one (1). If one or more of the neighboring pixels are labeled, then the lowest value neighbor label is chosen to be assigned to the current pixel, and neighbors with other label values are noted as being connected to this label. During a second pass, the block 138 uses the labels and group connection data from the first pass and each label is assigned to a new label such that all labels from the first pass that are connected map to the same label from the second pass. After the first and second passes, the block 138 stores the features as collections of (x,y) points, in magnified inches. In other embodiments, other known image processing techniques can be used to extract lines from the image 110C.

After the block 138, control passes to a block 140 that examines the extracted features (lines) to detect and correct for image rotation. In practice, the block 140 may be unnecessary since improper mounting of the camera would prevent the real-time adjustments while the press is running, e.g., the camera would obtain blurred images without distinct vertical lines. The process of block 140, however, is straightforward: for each image feature, the block 140 determines the least-squares line that passes through the collection of points, each line with an angle within +/−11.25 degrees is considered horizontal, and an average angle of the horizontal lines is taken. The block 140 can then correct for rotations by rotating the image features in an opposite direction by the average angle.

Following the block 140, control passes to an analysis block 142, which performs various processes to measure and determine alignment errors. Various modifications can be made to the process 130 of FIG. 6 without departing from the spirit of the present disclosure. For example, the process 130 can include additional or fewer processes blocks in any suitable order.

FIG. 7 illustrates an embodiment of the analysis block 142, which generally measures various distances between the adjacent groups of vertical lines 94L, 94R and compares those distances to known expected values to determine an alignment error along the X direction. Further, FIG. 7 matches the pattern 100 between adjacent groups of horizontal lines 96L, 96R, wherein the pattern generally includes 6 or more lines, and measures and compares distances between the horizontal lines of each group 96L, 96R to determine an alignment error along the Y-direction. The calculations can be refined by calculating an image magnification value and taking averages of the various measurements.

More specifically, FIG. 7 begins at a block 144, which separates image features into horizontal and vertical lines, sorts vertical lines from left to right, and sorts horizontal lines from top to bottom. Next, control passes to a block 146, which verifies existence of N vertical lines. In the present embodiment, N=6 but can generally be any integer greater than or equal to 6 if additional vertical lines are printed. The block 146 determines the X positions of the vertical lines and such positions are designated by V[i], i=1 . . . 6, such that V[1], V[2], and V[3] correspond to the three lines from left to right in the group of vertical lines 94L printed by the first printhead 82A, respectively, and V[4], V[5], and V[6] correspond to the three lines from left to right in the group of vertical lines 94R printed by the second printhead 82B, respectively.

After the block 146, a block 148 calculates the image magnification with the following formulas:

$$Gap1 = V[2] - V[1];$$

$$Gap2 = V[3] - V[2];$$

$$Gap3 = V[5] - V[4];$$

$$Gap4 = V[6] - V[5]; \text{ and}$$

$$M \text{ (magnification)} = 75*(Gap1+Gap2+Gap3+Gap4)/4.$$

The image magnification (M) is used in subsequent steps to more accurately measure distances between various lines in the captured image 110.

A following block 150 calculates distances for each combination of lines, calculates errors from expected distances, and takes the average of the calculated errors to measure an alignment error in the X direction. In the present embodiment, there are nine vertical line to vertical line distances and the above referenced calculations are performed using the following formulas:

$$ERR14 \text{ (Error in distance between lines 1 and 4)} = (V[4]-V[1])/M-\text{EXPECTED14 (Expected distance between lines 1 and 4)};$$

$$ERR15 = (V[5]-V[1])/M-\text{EXPECTED15};$$

$$ERR16 = (V[6]-V[1])/M-\text{EXPECTED16};$$

$$ERR24 = (V[4]-V[2])/M-\text{EXPECTED24};$$

$$ERR25 = (V[5]-V[2])/M-\text{EXPECTED25};$$

$$ERR26 = (V[6]-V[2])/M-\text{EXPECTED26};$$

$$ERR34 = (V[4]-V[3])/M-\text{EXPECTED34};$$

$$ERR35 = (V[5]-V[3])/M-\text{EXPECTED35}$$

$$ERR36 = (V[6]-V[3])/M-\text{EXPECTED36; and}$$

$$VERR = (ERR14+ERR15+ERR16+ERR24+ERR25+ERR26+ERR34+ERR35+ERR36)/9.$$

VERR is the measured alignment error in the X direction. The alignment system 30 uses VERR to correct for such error, e.g., by providing instructions to adjust the positions of printheads 82 within the imaging unit(s) 32 and/or by modifying the data sent to the imaging units to produce images.

Next, a block 152 further separates the horizontal lines into left/right sets 96L, 96R and determines the Y positions of the left/right sets of horizontal lines. Such positions are designated from top to bottom by L[i], i=1 ... $N_L$ for the horizontal lines on the left side of the image and R[i], i=1 ... $N_R$ for the horizontal lines on the right side of the image. A block 154 then measures the space (e.g., in device pixels, rounded) between the lines for each of the left and right sets using the following formulas:

$$G_L[i]=\text{ROUND}(600*(L[i+1]-L[i])/M), i=1\ldots N_L-1;$$
and
$$G_R[i]=\text{ROUND}(600*(R[i+1]-R[i])/M), i=1\ldots N_R-1.$$

A block 156 performs a pattern match between $G_L$ and $G_R$ to determine $Q_L$, $Q_R$, and N, where $Q_L$, $Q_R$ are indices of a start of a matched pattern on each side and N is the number of consecutive spaces matched. Referring to FIG. 5C, for example, the block 156 performs the pattern match by comparing the positions of each horizontal line in the group 96L to a corresponding horizontal line in the group 96R and/or compares spaces between corresponding adjacent lines of the groups 96L, 96R. Other known pattern matching algorithms/techniques can be used without departing from the spirit of the present disclosure.

Generally, increasing the number N of spaces matched will increase the accuracy of the alignment error measurements. In the present embodiment, if N is greater than or equal to 5, the block 156 measures the average distance between the associated lines to determine an alignment error in the Y direction using the formulas:

$$SDIST = \sum_{i=1}^{N+1} L_{Q_L^{+i}} - R_{Q_R^{+i}}; \text{ and}$$

$$HERR = SDIST / (M*N).$$

HERR is the measured alignment error in the Y direction. The alignment system 30 uses HERR to correct for such error, e.g., by providing instructions to adjust the positions of printheads within the imaging unit(s) 32 and/or by modifying the timing of data sent to the imaging units to produce images. Various modifications can be made to the process 142 of FIG. 7 without departing from the spirit of the present disclosure. For example, the process 142 can include additional or fewer processes blocks in any suitable order.

FIG. 8 is a flowchart of another alignment procedure 160 that can be implemented by suitable hardware and/or software incorporated into the controller 34, for example, to detect alignment errors. The procedure 160 begins at a block 162, which adjusts the sensor 38 position to the beginning of a first printhead and sets such position as a reference point. Next, a block 164 loads the alignment pattern 80 and a block 166 sets a drum side, e.g., sets a printhead assembly 64 to be analyzed for alignment errors. A block 168 then runs the printing system and instructs the imaging units 32 to produce the alignment pattern 80 on the substrate 36. Following the block 168, control passes to a block 170, which corrects for alignment errors in the X direction, for example, by adjusting a stitch nut of the printing system. Such alignment errors in the X direction could have been determined according to the processes 130, 142 of FIGS. 6 and 7, for example. Next, a block 172 advances the sensor 38 to the next position and a block 174 repeats the processes of the blocks 168-172 for all of the printheads. After the block 174, a block 176 measures alignment errors in the Y direction using the processes 130, 142 of FIGS. 6 and 7, for example, and provides instructions to correct for such errors. In the present embodiment, the block 176 is performed while the substrate is stationary. A block 178 then repeats the processes of block 166-176 for other colors, printhead assemblies, imaging units, etc. to align each printing components to the others.

Figure 9:
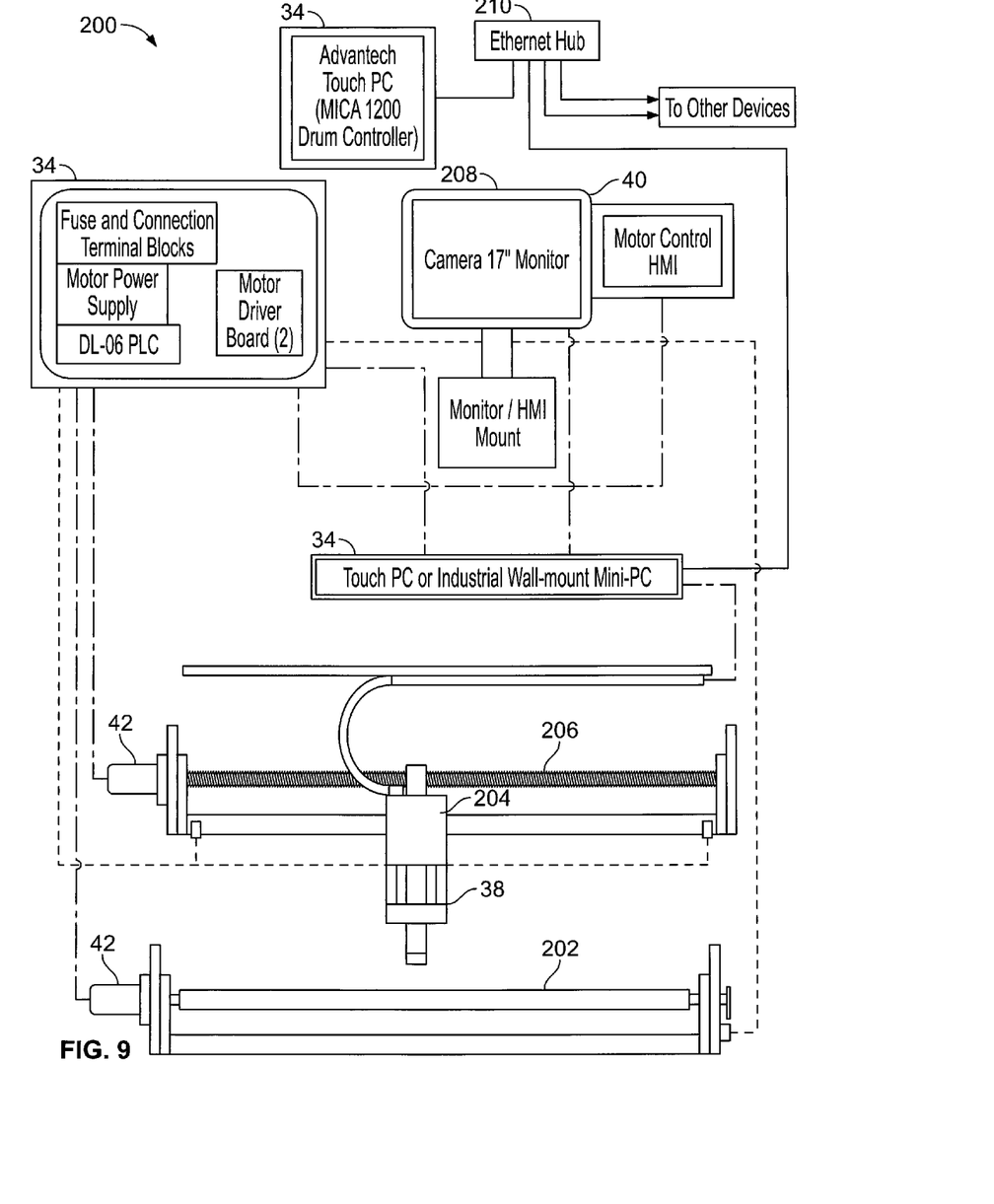
FIG. 9 is a diagrammatic view of another embodiment of an alignment system for detecting and correcting alignment errors of one or more printheads.

FIG. 9 illustrates another alignment system 200 similar to the alignment system 30 of FIG. 1 that is capable of implementing the processes disclosed herein to detect alignment errors and provide instructions to correct for such errors. In FIG. 9, the alignment system 200 includes various controllers 34 that can be configured to control the imaging unit(s) 32 of FIGS. 1-3B, for example, to produce the alignment pattern 80 on the substrate 36 and to control motors 42 associated with the sensor 38, imaging units 32, and/or a web support bar 202. The web support bar 202 can be selectively actuated to support the substrate 36 while the sensor 38 is capturing images thereof. In FIG. 9, the sensor 38 is a camera secured to a camera mount 204, which is generally adapted to secure cameras of any size and shape that could potentially be used to capture suitable images of the alignment pattern 80. Further, the camera mount 204 is secured to an acme screw 206 or some other device that allows the camera to move with respect to the width of the substrate 36. The system 200 further includes an I/O device 40 in the form of a monitor 208. Further, the system 200 includes a connection to an Ethernet hub 210 to allow various components of the alignment system 200, printing systems, and other devices to communicate with each other. Other modifications to the alignment system 200 can be made, as would be apparent to one of skill in the art.

Referring now to FIGS. 10A-10D, another alignment pattern 380 is illustrated that is printed on a substrate 36 by first, second, and third printheads 82X, 82Y, 82Z, respectively. The printheads 82X-82Z print adjacent printing swaths to one another but can otherwise be located in different printhead assemblies 64 and/or different imaging units 32. Further, the printheads 82X-82Z can print in the same or different colors, as would be apparent to one of ordinary skill. In FIGS. 10A-10D, the alignment system 30 includes first, second, and third sensors, 38A, 38B, 38C to measure the times when the alignment pattern 380 passes the sensors as the substrate 36 moves past the sensors in a direction designated by an arrow 384. In the present embodiment, the first sensor 38A is stationary reference sensor and the second and third sensors 38B, 38C are moveable. An example of a suitable sensor is a Smarteye X-Pro XP10 high speed photoelectric sensor from Tri-Tronics, of 7705 Cheri Court, Tampa, Fla. 33634. However, in other embodiments, other types of sensors 38 can be used, as would be apparent to one of ordinary skill in the art.

For reference purposes only, a Y-axis 86 and an X-axis 88 are defined with respect to the arrow 384, wherein the Y-axis is generally parallel to the arrow and the X-axis is generally orthogonal to the arrow. Further, dimensions along the Y-axis 86 may be referred to as being along a length of the substrate 36 and dimensions along the X-axis 88 may be referred to as being across a width of the substrate.

Referring generally to FIGS. 10A-10D, the printheads 82X-82Z print first, second, and third portions 390X, 390Y, 390Z, respectively, of the alignment pattern 380. Each of the portions 390 includes a horizontal line 392 generally parallel to the X-axis 88 and one or more diagonal lines 394 that extend along non-zero angles with respect to the X-axis. In the alignment pattern 380 of FIGS. 10A-10D, the first portion 390X includes three diagonal lines 394 and each of the second and third portions 390Y, 390Z includes two diagonal lines 394. FIGS. 10A-10D illustrate a single row of horizontal and diagonal lines 392, 394, however, in other embodiments, the pattern 380 is repeated along the length of the substrate 36.

Figure 11:
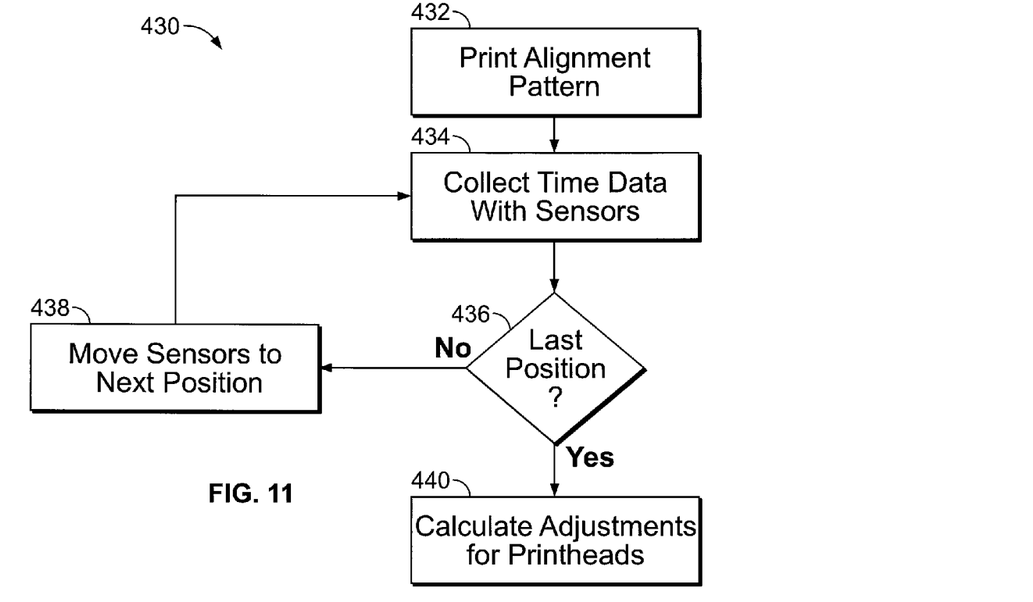
FIG. 11 is a flowchart according to another embodiment of a process for detecting alignment errors using the alignment pattern of FIGS. 10A-10D.

FIG. 11 illustrates a process 430 that can be implemented by suitable hardware and/or software incorporated into the controller 34, for example, to detect alignment errors utilizing the alignment pattern 380 and the three sensors 38A-38C. The process 430 begins at a block 432, which instructs the printheads 82X-82Z to print the alignment pattern 380. Next, a block 434 collects time data of the moving alignment pattern 380 with the sensors 38A-38C and a decision block 436 determines if the moveable sensors 38B, 38C are in a last position. If not, then control passes to a block 438, which moves the sensors 38B, 38C to a next position and the block 434 collects time data with the sensors at the next position. If the block 436 determines that the moveable sensors 38B, 38C are in the last position, then control passes to a block 440, which calculates adjustments for the printheads 82.

Figure 10A:
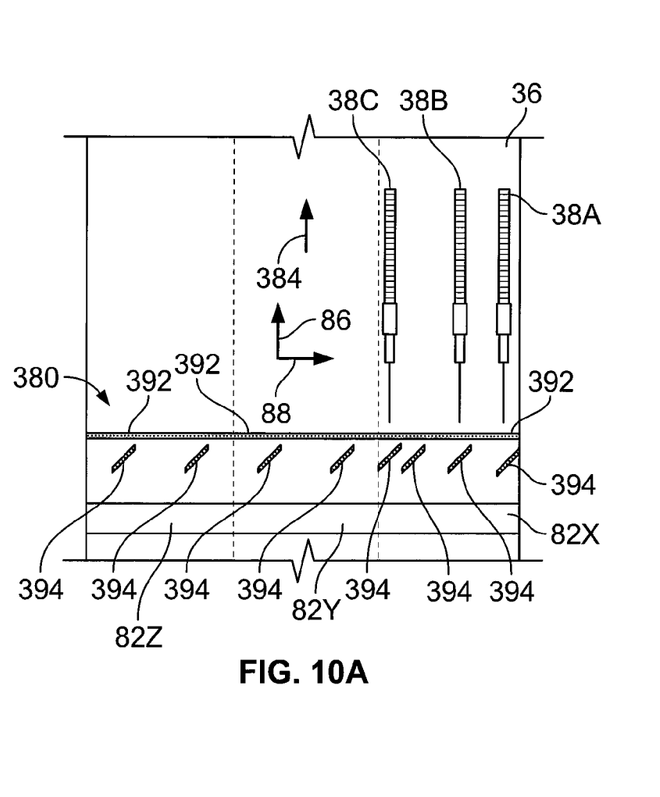
FIGS. 10A-10D illustrate another embodiment of an alignment pattern with sensors in different positions with respect to the alignment pattern.
Figure 10B:
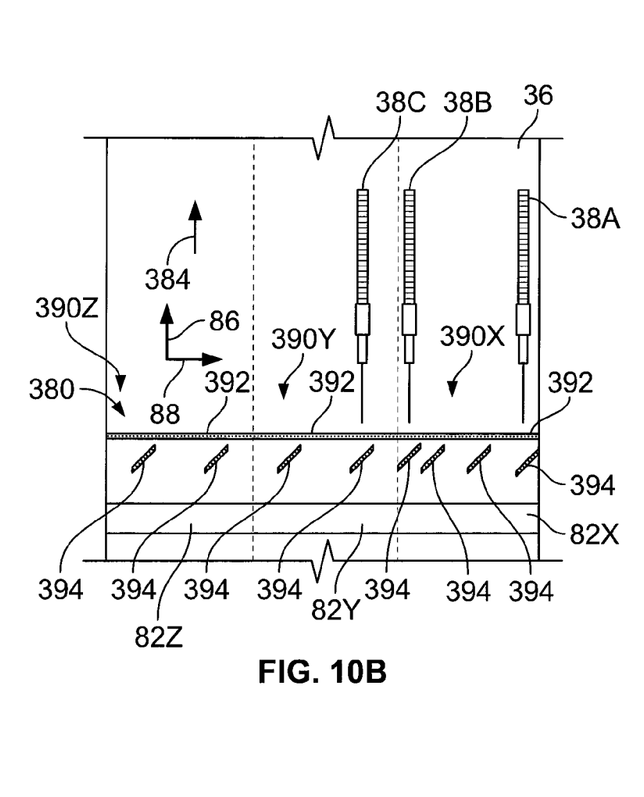
Figure 10C:
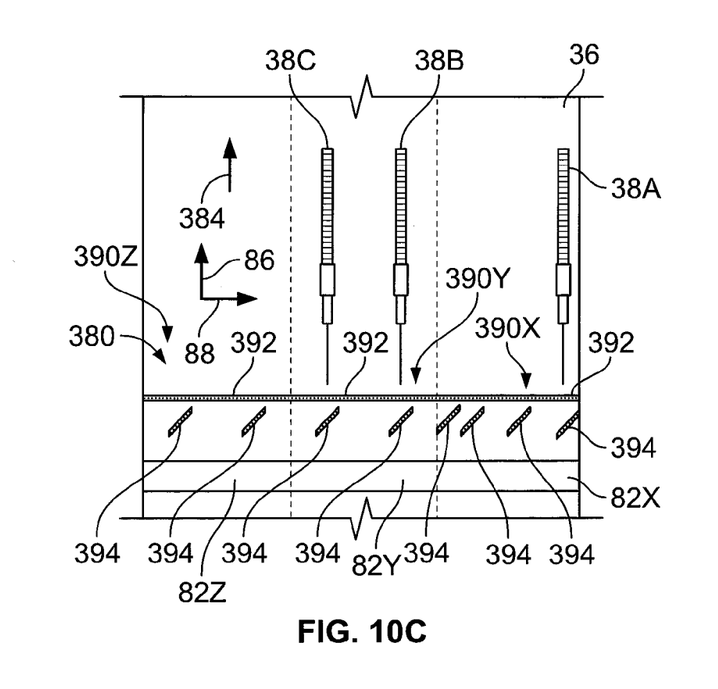
Figure 10D:
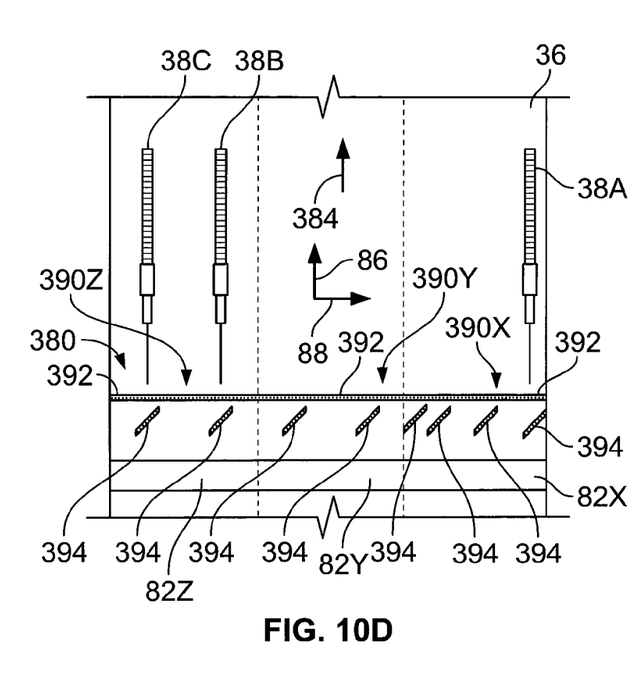

FIGS. 10A-10D illustrate the movement of the sensors 38B, 38C to "a next position" of the block 438 of FIG. 11. For example, FIG. 10A illustrates a first position with all three sensors 38A-38C positioned at the first printhead 82X and FIG. 10B shows sensors 38B, 38C moved to a next position in which the sensor 38B is located on the first printhead but the sensor 38C has moved to the second printhead 32Y. FIG. 10C illustrates a next position with the sensors 38B, 38C both moved to the second printhead 82Y and FIG. 10D illustrates a last position with the sensors 38B, 38C both moved to the last printhead, which in the present embodiment is the printhead 82Z. The movement of the sensors 38B, 38C can be modified in other embodiments, as would be apparent to one of ordinary skill in the art.

Figure 12:
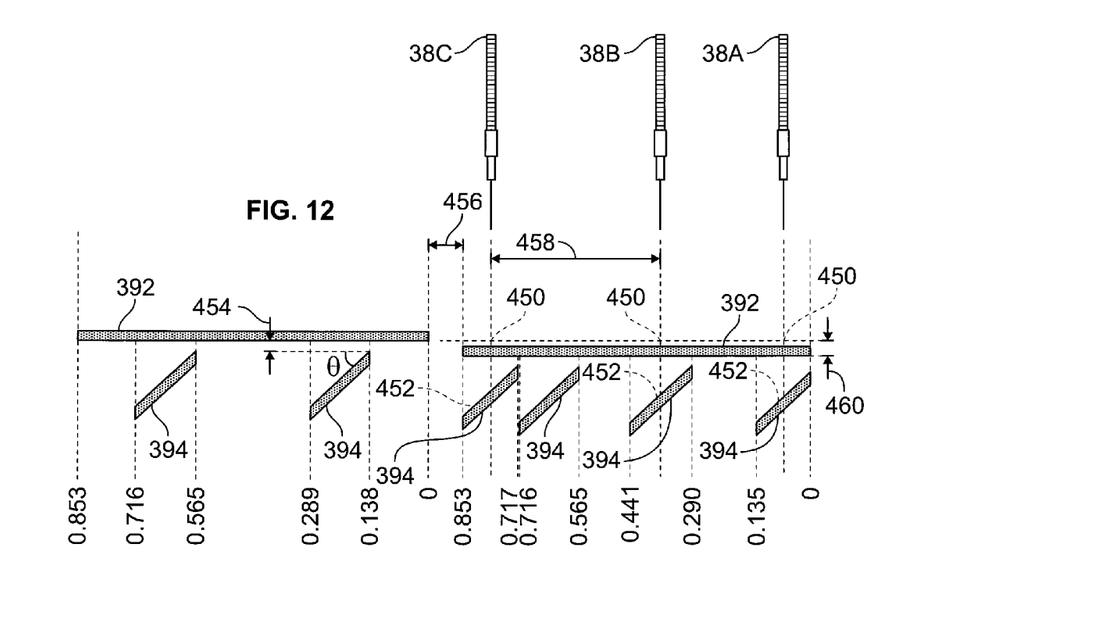
FIG. 12 illustrates a portion of the alignment pattern of FIG. 10A with various features that are used to detect alignment errors.

Referring to the example of FIG. 12, which illustrates the sensors 38A-38B in the first position of FIG. 10A, the diagonal lines are printed at 45° angles so that θ=45°. Choosing θ to be 45° is used in the present embodiment so that the time data is proportional to a distance along the substrate 36 and so that the distance along the substrate is the same as the distance across the substrate. This allows calculations to be performed without the use of trigonometric functions.

Each sensor 38A-38C collects 4 time points for each portion 390 of the alignment pattern 380. These time points correspond to the rising and falling edges of the horizontal lines 392 and the rising and falling edges of the diagonal lines 394. Time point 450 in FIG. 12 is an average of the rising and falling times of the horizontal lines 392 and time point 452 is an average of the rising and falling times of the diagonal lines 394. The notation for referencing these points is $t_s[p]$ where s denotes the sensor (1=sensor 38B, 2=sensor 38C, and R=sensor 38A) and p denotes the time point (450 or 452). Further, a single prime symbol indicates that the variable corresponds to time data collected when the moveable sensors 38B, 38C are located at the second position (e.g., FIG. 10B), double prime refers to time data gathered at the third position (e.g., FIG. 10C), and so on.

FIG. 12 also identifies an angledLineOffset value 454 (the distance between horizontal and diagonal lines 392, 394), which is a constant used in some of the following formulas. However, the angledLineOffset value 454 ultimately is cancelled out in the formula for xAdjustment, as will be discussed hereinafter. An average substrate velocity, denoted by v(bar), is calculated by dividing a distance between consecutive horizontal lines 392 by the difference between $t_{1,2,R}[1]$ for one pattern from $t_{1,2,R}[1]$ for a next pattern.

Further, an xAdjustment value 456 is used to determine a separation between adjacent printheads 82 across the width of the substrate 36. In the present embodiment, the xAdjustment value 456 is positive whereas if adjacent printheads 82 overlap then xAdjustment would be negative. The sign of the xAdjustment value 456 determines the direction that one printhead 82 must move in order to be aligned with an adjacent printhead. In the present embodiment, the angled lines 394 are used to determine the positions of the moveable sensors 38B, 38C. The sensors 38B, 38C are mounted one-half printhead width apart (approximately 0.427 inches) and, consequently, any deviation in the difference of the positions of sensors 38B, 38C from 0.427 inches is calculated as the xAdjustment value 456. The distance between the sensors 38B, 38C is a calculated value (xSensorToSensor 458) since the sensors cannot be mounted with absolute precision. Still further, a yAdjustment value 460 corresponds to an alignment error along the length of the substrate 36 and is calculated by comparing the relative times that the horizontal line 392 is detected in the various positions of FIGS. 10A-10D.

In general, if each printhead 82 is properly aligned with adjacent printheads in both X and Y directions, then when sensors 38B, 38C straddle two adjacent printheads, e.g., printheads 82X, 82Y, the sensors should be located on horizontal centers of the angled lines 394.

Referring again FIG. 11, the block 440 uses the time data collected with the sensors 38A-38C in the various positions with respect to the alignment pattern 380 to calculate adjustments along the length (yAdjustment 460) and across the width (xAdjustment 456) of the substrate 36 for each printhead. In the present embodiment, the block 440 performs the following procedure to calculate such values:

Calculate the positions of sensors 38B, 38C and the distance between them when they are located in a first position (e.g., FIG. 10A), using the following formulas:

$$x\text{PosSensor}1 = 0.290 + \bar{v}(t_1[2] - t_1[1]) - \text{angledLineOffset};$$

$$x\text{PosSensor}2 = 0.717 + \bar{v}(t_2[2] - t_2[1]) - \text{angledLineOffset};$$
and $$x\text{SensorToSensor} = x\text{PosSensor}2 - x\text{PosSensor}1 = 0.427 + \bar{v}(t_2[2] - t_2[1] - (t_1[2] - t_1[1])).$$

Repeat the same calculations for sensors 38B, 38C located in the second position (e.g., FIG. 10B).

$$x\text{PosSensor}1' = 0.565 + \bar{v}(t_1'[2] - t_1'[1]) - \text{angledLineOffset};$$

$$x\text{PosSensor}2' = 0.853 + x\text{Adjustment} + \bar{v}(t_2'[2] - t_2'[1]) - \text{angledLineOffset} + 0.138;$$
and $$x\text{SensorToSensor}' = x\text{PosSensor}2' x\text{PosSensor}1' = 0.426 + x\text{Adjustment} + \bar{v}(t2'[2]t2'[1](t1'[2]t1'[1])).$$

Equate xSensorToSensor' and xSensorToSensor, which is the case when two adjacent printheads are stitched correctly, and solve for xAdjustment 456, wherein the equation for xAdjustment is:

xSensorToSensor'=xSensorToSensor;

$$x\text{Adjustment} = x\text{SensorToSensor} - 0.426 - \bar{v}(t_2'[2] - t_2'[1] - (t_1'[2] - t_1'[1])); \text{ and}$$

$$x\text{Adjustment} = 0.001 + \bar{v}(t_2[2] - t_2[1] - (t_1[2] - t_1[1]) - (t_2'[2] - t_2'[1]) + (t_1'[2] - t_1'[1]))$$

Calculate yAdjustment 460 by comparing the relative time between the reference sensor 38A and the moveable sensors 38B, 38C at the point 450 on the printhead 82X to the relative time between the reference sensor 38A and the moveable sensors 38B, 38C at the point 450 on the printhead 82Y. In the present embodiment, the yAdjustment 460 can be calculated using various different formulas, e.g.:

$$y\text{Adjustment} = \bar{v}(t_1''[1] - t_R''[1] - (t_1[1] - t_R[1]));$$

$$y\text{Adjustment} = \bar{v}(t_1'''[1] - t_R'''[1] - (t_1[1] - t_R[1]));$$

$$y\text{Adjustment} = \bar{v}(t_2'[1] - t_R''[1] - (t_2[1] - t_R[1])); \text{ and}$$

$$y\text{Adjustment} = \bar{v}(t_2''[1] - t_R''[1] - (t_1[1] - t_R[1]))$$

The above calculations can be averaged together to produce a more accurate value for yAdjustment 460.

In another embodiment, the alignment pattern 380 is repeated a plurality of times, e.g., 130 times, and the block 440 calculates the xAdjustment and yAdjustment values 456, 460 for each printed alignment pattern 130. In this embodiment, the xAdjustment and yAdjustment values 456, 460 can be an average of the 130 calculations, which reduces the variance of the adjustments due to error in the sensor measurements and fluctuations in the substrate velocity.

The xAdjustment and yAdjustment values 456, 460 calculated by the block 440 of FIG. 11 can be used as inputs into an automated printhead registration system. For example, the xAdjustment values 456 can be fed to motors that move individual printheads 82 across the substrate 36 and the yAdjustment values 460 can be fed to a print controller that electronically delays printing along the substrate. Such a system could be completely automated, requiring no human assistance.

The alignment systems and methods described herein can be utilized to verify the alignment of printheads 82 by inserting the alignment pattern 80, 380 at some interval into a production job. In this way, the stitching and registration of the printheads 82 can be monitored every 10,000 forms, for example, to ensure that the production documents maintain a high quality level.

Other embodiments of the disclosure including all the possible different and various combinations of the individual features of each of the foregoing described embodiments are specifically included herein.

Industrial Applicability

The alignment systems disclosed herein may be utilized to simplify and automate the process of detecting and subsequently correcting alignment errors in one or more imaging units and printheads. Further, various calculations can be performed to enhance the accuracy and speed of the detection and correction process. Still further, the alignment systems disclosed herein are easily scalable to be utilized with a wide variety of sizes, types, and configurations of imaging systems.

Numerous modifications to the present disclosure will be apparent to those skilled in the art in view of the foregoing description. Accordingly, this description is to be construed as illustrative only and is presented for the purpose of enabling those skilled in the art to make and use the disclosure and to teach the best mode of carrying out the same. The exclusive right to all modifications within the scope of this disclosure is reserved.

We claim:

1. A method of detecting an alignment error, comprising the steps of:
    controlling a first inkjet printhead to image on a substrate a first plurality of substantially parallel lines extending along a first direction, wherein the first plurality of lines includes a first line and a second line, and the first line and the second line are spaced apart along a second direction substantially orthogonal to the first direction;
    controlling a second inkjet printhead to image on the substrate a second plurality of substantially parallel lines extending along the first direction, wherein the second plurality of lines includes a third line and a fourth line, the third line and the fourth line are spaced apart along the second direction, and the lines imaged by the first and second inkjet printheads form an alignment pattern;
    collecting data relating to the alignment pattern, including the step of measuring distances between the first line and the third line, the first line and the fourth line, the second line and the third line, and the second line and the fourth line; and
    analyzing the collected data to determine an alignment error between the first and the second inkjet printheads.

2. The method of claim 1, further including the steps of:
    controlling the first inkjet printhead to image on the substrate a third plurality of substantially parallel lines extending along the second direction, wherein one or more distances between adjacent lines of the third plurality of lines are varied; and
    controlling the second inkjet printhead to image on the substrate a fourth plurality of substantially parallel lines extending along the second direction, wherein one or more distances between adjacent lines of the fourth plurality of lines are varied, and wherein each of the third and fourth pluralities of lines includes six or more lines that are each separated by one or more different known distances to form first and second patterns, respectively.

3. The method of claim 1, wherein each of the first and second plurality of lines includes at least three lines that are separated by known equal distances from each other, and wherein the first plurality of lines are adjacent the second plurality of lines.

4. The method of claim 2, wherein the first direction is along a length of the substrate and the second direction is across a width of the substrate.

5. The method of claim 1, wherein the step of collecting data includes the step of controlling a sensor to capture an image of the alignment pattern, and wherein the step of analyzing the collected data includes the steps of converting the image to a grayscale image, processing the image for whiteness correction, processing the image to obtain a binarized image, and extracting features from the image.

6. The method of claim 5, wherein the step of analyzing the data further includes the step of detecting and correcting for image rotation.

7. The method of claim 1, wherein the step of analyzing the data includes the steps of calculating distances between the lines of the first and second pluralities of lines and comparing the calculated distances to expected values to determine an alignment error along the first direction.

8. A method of detecting an alignment error, comprising the steps of:
    controlling a first imaging unit to image on a substrate a first plurality of substantially parallel lines extending along a first direction, wherein the first plurality of lines includes a first line and a second line;

controlling a second imaging unit to image on the substrate a second plurality of substantially parallel lines extending along the first direction, wherein the second plurality of lines includes a third line and a fourth line, and the lines imaged by the first and second imaging units form an alignment pattern;

collecting data relating to the alignment pattern, including the step of measuring distances between the first line and the third line, the first line and the fourth line, the second line and the third line, and the second line and the fourth line; and analyzing the collected data to determine an alignment error between the first and the second imaging units, wherein the step of analyzing the data includes the steps of calculating distances between the lines of the first and second pluralities of lines and comparing the calculated distances to expected values to determine an alignment error along the first direction, and wherein the step of calculating distances between the lines of the first and second pluralities of lines includes the steps of determining positions of each of the lines of the first and second pluralities of lines, calculating an image magnification utilizing the determined positions, and calculating distances between each line in the first plurality of lines and each line in the second plurality of lines utilizing the image magnification, further wherein the step of comparing the calculated distances to expected values to determine an alignment error along the first direction includes the step of averaging differences between the calculated distances and the expected values to determine the alignment error along the first direction.

9. The method of claim 2, wherein the step of analyzing the data includes the steps of calculating distances between the lines of the third plurality of lines, calculating distances between the lines of the fourth plurality of lines, matching a first pattern from the third plurality of lines to a second pattern from the fourth plurality of lines utilizing the calculated distances, and comparing the matched first and second patterns to determine an alignment error along the second direction.

10. A method of detecting an alignment error, comprising the steps of:

controlling a first imaging unit to image on a substrate a first plurality of substantially parallel lines extending along a first direction, wherein the first plurality of lines includes a first line and a second line;

controlling a second imaging unit to image on the substrate a second plurality of substantially parallel lines extending along the first direction, wherein the second plurality of lines includes a third line and a fourth line, and the lines imaged by the first and second imaging units form an alignment pattern;

collecting data relating to the alignment pattern, including the step of measuring distances between the first line and the third line, the first line and the fourth line, the second line and the third line, and the second line and the fourth line;

analyzing the collected data to determine an alignment error between the first and the second imaging units;

controlling the first imaging unit to image on the substrate a third plurality of substantially parallel lines extending along a second direction, wherein one or more distances between adjacent lines of the third plurality of lines are varied; and controlling the second imaging unit to image on the substrate a fourth plurality of substantially parallel lines extending along the second direction, wherein one or more distances between adjacent lines of the fourth plurality of lines are varied, and wherein each of the third and fourth pluralities of lines includes six or more lines that are each separated by one or more different known distances to form first and second patterns, respectively, wherein the step of analyzing the data includes the steps of calculating distances between the lines of the third plurality of lines, calculating distances between the lines of the fourth plurality of lines, matching a first pattern from the third plurality of lines to a second pattern from the fourth plurality of lines utilizing the calculated distances, and comparing the matched first and second patterns to determine an alignment error along the second direction, and wherein the step of calculating distances between lines of the third and fourth pluralities of lines includes the steps of calculating an image magnification and utilizing the image magnification to calculate the distances, wherein the step of matching a first pattern from the third plurality of lines to a second pattern from the fourth plurality of lines includes the steps of comparing spaces between pairs of lines of the first pattern with spaces between corresponding pairs of lines of the second pattern and matching a number of consecutive spaces, and wherein the step of comparing the matched first and second patterns to determine an alignment error along the second direction includes the step of calculating an average distance between corresponding lines of the first and second patterns.

11. The method of claim 10, wherein the step of matching a number of consecutive spaces includes matching five or more consecutive spaces.

12. A system for detecting an alignment error, comprising:
first and second inkjet printheads;
a sensor; and
a controller to control the first inkjet printhead to image on a substrate a first plurality of substantially parallel lines extending along a first direction, and to control the second inkjet printhead to image on the substrate a second plurality of substantially parallel lines extending along the first direction, wherein the first plurality of lines includes a first line and a second line spaced apart along a second direction substantially orthogonal to the first direction, the second plurality of lines includes a third line and a fourth line spaced apart along the second direction, and the lines imaged by the first and second inkjet printheads form an alignment pattern, wherein the controller is configured to control the sensor to collect data relating to the alignment pattern, wherein the data include measurements of distances between the first line and the third line, the first line and the fourth line, the second line and the third line, and the second line and the fourth line, and wherein the controller is configured to analyze the collected data to determine an alignment error between the first and the second inkjet printheads.

13. The system of claim 12, wherein the controller further controls the first inkjet printhead to image on the substrate a third plurality of substantially parallel lines extending along the second direction, wherein the controller further controls the second inkjet printhead to image on the substrate a fourth plurality of substantially parallel lines extending along the second direction, wherein one or more distances between adjacent lines of the fourth plurality of lines are varied, wherein one or more distances between adjacent lines of the second plurality of lines are varied, and wherein each of the third and fourth pluralities of lines includes six or more lines that are each separated by one or more different known distances to form first and second patterns, respectively.

14. The system of claim 12, wherein each of the first and second plurality of lines includes at least three lines that are separated by known equal distances from each other, and wherein the first plurality of lines are adjacent the second plurality of lines.

15. The system of claim 13, wherein the first direction is along a length of the substrate and the second direction is across a width of the substrate.

16. The system of claim 12, wherein the controller is configured to control the sensor to capture an image of the alignment pattern, and wherein the controller is further configured to convert the image to a grayscale image, process the image for whiteness correction, process the image to obtain a binarized image, and extract features from the image.

17. The system of claim 12, wherein the controller is configured to calculate distances between the lines of the first plurality and second plurality of lines and compare the calculated distances to expected values to determine an alignment error along the first direction.

18. A system for detecting an alignment error, comprising:
one or more imaging units;
a sensor; and
a controller to control a first imaging unit to image on a substrate a first plurality of substantially parallel lines extending along a first direction, and to control a second imaging unit to image on the substrate a second plurality of substantially parallel lines extending along the first direction,
wherein the first plurality of lines includes a first line and a second line, the second plurality of lines includes a third line and a fourth line, and the lines imaged by the first and second imaging units form an alignment pattern,
wherein the controller is configured to control the sensor to collect data relating to the alignment pattern, wherein the data include measurements of distances between the first line and the third line, the first line and the fourth line, the second line and the third line, and the second line and the fourth line,
wherein the controller is configured to analyze the collected data to determine an alignment error between the first and the second imaging units,
wherein the controller is configured to calculate distances between the lines of the first plurality and second plurality of lines and compare the calculated distances to expected values to determine an alignment error along the first direction,
wherein the controller is configured to calculate distances between the lines of the first and second pluralities of lines by determining positions of each of the lines of the first and second pluralities of lines, calculating an image magnification utilizing the determined positions, and calculating distances between each line in the first plurality of lines and each line in the second plurality of lines utilizing the image magnification, further wherein the controller is configured to compare the calculated distances to expected values to determine an alignment error along the first direction by averaging differences between the calculated distances and the expected values to determine the alignment error along the first direction.

19. The system of claim 13, wherein the controller is configured to analyze the data by measuring distances between the lines of the third plurality of lines, measuring distances between the lines of the fourth plurality of lines, matching a first pattern from the third plurality of lines to a second pattern from the fourth plurality of lines utilizing the measured distances, and comparing the matched first and second patterns to determine an alignment error along the second direction.

20. A system for detecting an alignment error, comprising:
one or more imaging units;
a sensor; and
a controller to control a first imaging unit to image on a substrate a first plurality of substantially parallel lines extending along a first direction, and to control a second imaging unit to image on the substrate a second plurality of substantially parallel lines extending along the first direction,
wherein the first plurality of lines includes a first line and a second line, the second plurality of lines includes a third line and a fourth line, and the lines imaged by the first and second imaging units form an alignment pattern,
wherein the controller is configured to control the sensor to collect data relating to the alignment pattern, wherein the data include measurements of distances between the first line and the third line, the first line and the fourth line, the second line and the third line, and the second line and the fourth line,
wherein the controller is configured to analyze the collected data to determine an alignment error between the first and the second imaging units,
wherein the controller further controls the first imaging unit to image on the substrate a third plurality of substantially parallel lines extending along a second direction, wherein the controller further controls the second imaging unit to image on the substrate a fourth plurality of substantially parallel lines extending along the second direction, wherein one or more distances between adjacent lines of the fourth plurality of lines are varied, wherein one or more distances between adjacent lines of the second plurality of lines are varied, wherein one or more distances between adjacent lines of the fourth plurality of lines are varied, and wherein each of the third and fourth pluralities of lines includes six or more lines that are each separated by one or more different known distances to form first and second patterns, respectively,
wherein the controller is configured to analyze the data by measuring distances between the lines of the third plurality of lines, measuring distances between the lines of the fourth plurality of lines, matching a first pattern from the third plurality of lines to a second pattern from the fourth plurality of lines utilizing the measured distances, and comparing the matched first and second patterns to determine an alignment error along the second direction, and
wherein the controller is configured to calculate distances between lines of the third and fourth pluralities of lines by calculating an image magnification and utilizing the image magnification to calculate the distances, wherein the controller is configured to match a first pattern from the third plurality of lines to a second pattern from the fourth plurality of lines by comparing spaces between pairs of lines of the first pattern with spaces between corresponding pairs of lines of the second pattern and matching a number of consecutive spaces, and wherein the controller is configured to compare the matched first and second patterns to determine an alignment error along the second direction by calculating an average distance between corresponding lines of the first and second patterns.

* * * * *